United States Patent [19]

Mutch

[11] Patent Number: 4,998,409

[45] Date of Patent: Mar. 12, 1991

[54] THRUST REVERSER TORQUE RING

[75] Inventor: Henry Mutch, Chula Vista, Calif.

[73] Assignee: Rohr Industries, Inc., Chula Vista, Calif.

[21] Appl. No.: 411,992

[22] Filed: Sep. 25, 1989

[51] Int. Cl.⁵ .............................................. F02K 1/72
[52] U.S. Cl. .................................... 60/226.2; 60/230; 239/265.29; 239/265.31
[58] Field of Search ............................. 60/226.2, 230; 239/265.29, 265.31, 265.37; 244/110 B, 12.5

[56] References Cited

U.S. PATENT DOCUMENTS

| | | | |
|---|---|---|---|
| 3,500,645 | 3/1970 | Hom ................... | 239/265.29 |
| 3,500,646 | 3/1970 | Hom et al. ........... | 60/226.2 |
| 3,779,010 | 12/1973 | Chamay et al. ....... | 239/265.31 |
| 4,030,291 | 6/1977 | Sargisson ............ | 60/226.2 |
| 4,145,877 | 3/1979 | Montgomery .......... | 60/226.2 |
| 4,177,639 | 12/1979 | Taylor ............... | 239/265.31 |
| 4,216,926 | 8/1980 | Lawson ............... | 239/265.31 |

FOREIGN PATENT DOCUMENTS

| | | | |
|---|---|---|---|
| 109219 | 5/1984 | European Pat. Off. ........ | 60/226.2 |
| 916968 | 1/1963 | United Kingdom .......... | 239/265.29 |

*Primary Examiner*—Donald E. Stout
*Attorney, Agent, or Firm*—Patrick J. Schlesinger; Frank D. Gilliam

[57] ABSTRACT

A thrust ring assembly for use in a thrust reverser system for a gas turbine engine. The ring assembly is useful in a turbine engine having a core engine surrounded by an engine casing and nacelle, with a fan at the inlet directing air flow into the bypass duct between core engine and nacelle. The thrust reverser basically comprises at least one opening through the engine casing and nacelle, a turning vane cascade in the opening, a cover movable by an actuator between positions covering and uncovering the opening and at least one blocker door movable between a position allowing flow through the bypass duct and a position diverting flow to the turning vane cascade. The actuator and cascade are severely aerodynamically loaded during thrust reversal. The improved thrust ring assembly carriers those loads and transfers them to the engine casing. The forward ends of the cascade and actuator are secured to a bulkhead ring which is secured to the base of a frustoconical ring. An inwardly directed torque ring V-blade at the apex of the frustoconical ring is received in a groove in an engine ring secured to the engine casing to transfer the loads. A curved ramp ring secured to the inner edges of said bulkhead ring and torque ring smoothes air flow from the bypass duct to the cascade.

4 Claims, 3 Drawing Sheets

THRUST REVERSER TORQUE RING

BACKGROUND OF THE INVENTION

This invention relates in general to gas turbine engine thrust reversers and, more specifically, to an improved torque ring assembly for transferring aerodynamic loads from a thrust reverser back to the engine casing.

Gas turbine engines of several types have come into widespread use with large passenger aircraft. In order to reduce aircraft ground speed after landing, most such engines include a thrust reverser of some sort to direct engine thrust from the normal aft direction to a more forward direction, thus using engine thrust to dynamically reduce aircraft speed.

A large variety of thrust reversers have been designed for use with different gas turbine engines. Some use simple, large and sturdy "clamshell" mechanisms in which large deflector doors are pivoted from position out of the engine outlet thrust path to a position substantially blocking the outlet flow and directing it in a forwardly direction. Typical of these are the thrust reversers described by Feld et al in U.S. Pat. No. 3,550,855 and by Johnson in U.S. Pat. No. 2,871,656.

The deflector door or clamshell system is not suitable for use with fan type gas turbine engines. Fan jets include a core engine surrounded by a tubular nacelle defining a bypass duct between nacelle and core. A fan at the engine inlet, driven by the core engine, directs a compressed air flow through the bypass duct. A number of different thrust reversers have been developed for fan jet engines. In general, they include a ring of openings through the nacelle which contains a turning vane cascade. An actuator moves a cover between positions uncovering and covering the openings. Blocking doors aft of the cascade are movable between a first position in which bypass duct air flow is unhindered and a second position in which air flow through the bypass duct is blocked and forced through direction, serving to reverse thrust direction and slow the aircraft. Typical of these fan jet cascade type thrust reversers are those described by Hom et al in U.S. Pat. No. 3,500,646 and Maison in U.S. Pat. No. 3,601,992.

The turning vane cascade and cover actuator mounts are subjected to severe aerodynamic loading during high speed thrust reversal. They must be mounted to the relatively thin nacelle adjacent to the engine casing in a manner which does not obstruct bypass duct flow during normal engine operation. Complex mounting arrangements tend to be less reliable, add undesirable weight and be difficult to service.

Many of the present cascade type thrust reversers operate satisfactorily. However, there is a continuing need for improved arrangements for mounting and supporting the cascade and actuator to improve simplicity and reliability and reduce weight while providing optimum air flow to the cascade during thrust reversal.

SUMMARY OF THE INVENTION

The above-noted problems, and others, are overcome by the improved torque ring mounting system for supporting turning vane cascade sets and cover door actuators in thrust reversers of the cascade type.

This improvement is primarily useful with fan jet engines of the sort described above, which use cascade type thrust reversers. With most engines, there is a ring of cascade assemblies around the nacelle, with a plurality of spaced actuator assemblies to jointly move the covers.

The torque ring assembly, which supports the forward ends of the turning vane cascade assemblies and cover actuator assemblies comprises three basic components. A bulkhead ring supports the forward ends of the actuators and cascades. The base end of a frustoconical ring is secured to said bulkhead ring. An inwardly directed torque ring V-blade is mounted at the apex end of said frustoconical ring. An engine ring securely mounted on the engine casing has an outwardly directed groove adapted to supportingly receive the V-blade. A curved ramp ring is secured to the inner side of the frustoconical ring near the base and apex edges and is shaped to smooth air flow from the engine bypass duct to the turning vane cascades during thrust reverser operation.

While it is preferred and most effective to mount both the forward end of the turning vane cascades and the cover actuators on the torque ring assembly, if desired an alternate mount could be used for the actuators.

While the various components of the torque ring assembly may be formed from any suitable material, such as various metals and fiber reinforced composites, best results are generally obtained, with the optimum combination of light weight and high strength, where the various rings are formed from a graphite fiber reinforced resin and the V-blade and the grooved engine ring are formed from a metal such as aluminum.

The torque ring assembly is high in strength, light in weight and simple in design to provide maximum reliability. The interlocking V-blade and groove arrangement transfers complex and irregular loads effectively while permitting convenient assembly and maintenance.

BRIEF DESCRIPTION OF THE DRAWING

Details of the invention, and of a preferred embodiment thereof, will be further understood upon reference to the drawing, wherein.

DETAILED DESCRIPTION OF A PREFERRED EMBODIMENT

Figure 1:
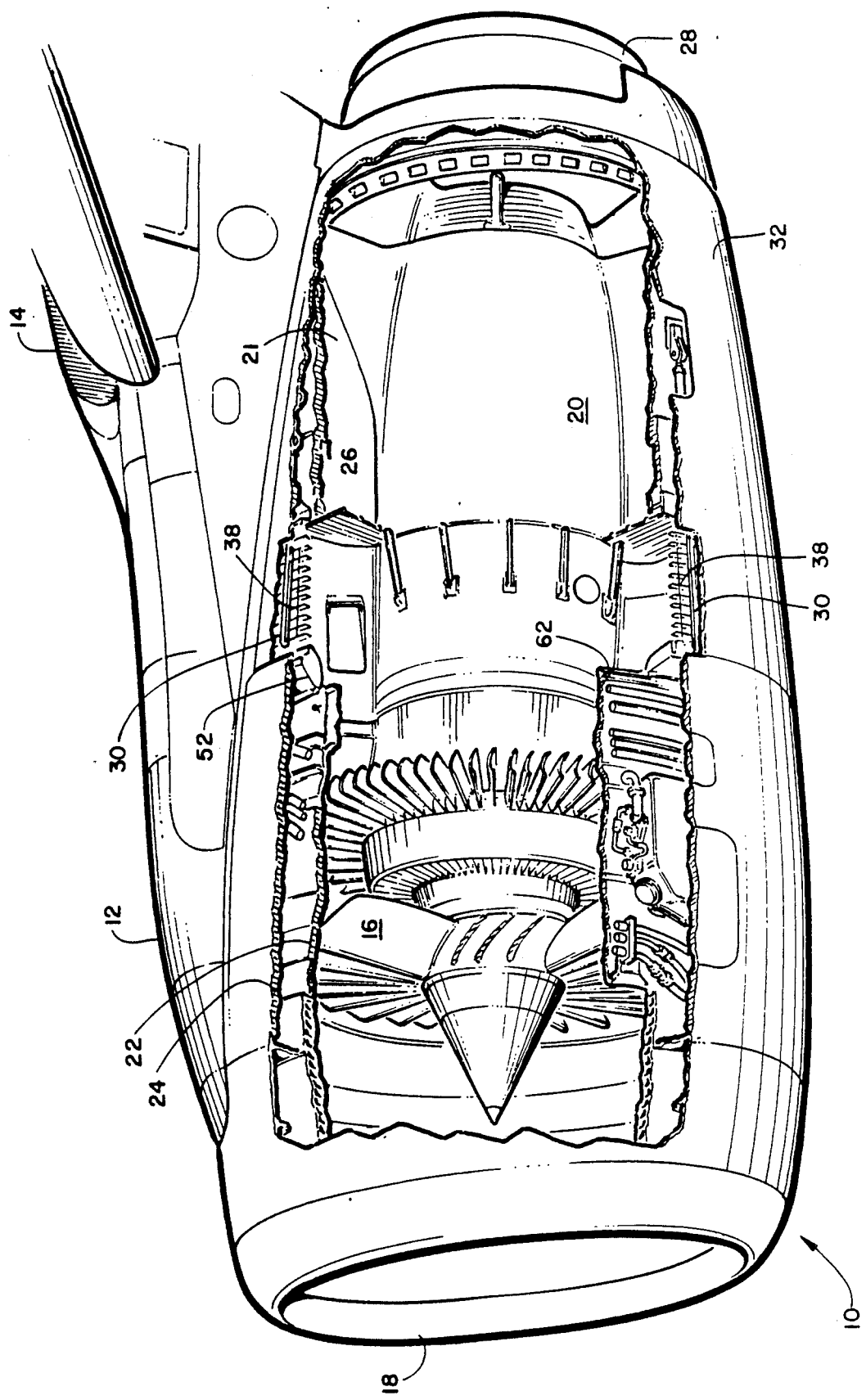
FIG. 1 is a schematic perspective view of fan jet engine, partially cut away to show the improvement of this invention.

Referring now to FIG. 1, there is seen a conventional gas turbine engine of the fan type, mounted by a pylon 12 on an aircraft wing 14. A fan 16 located just within engine inlet 18 is driven by a core engine within engine inner shroud 20. Shroud 20 is ordinarily a honeycomb structure formed from two approximately "C" shaped halves with edge extensions 21 which extend to the inner wall of engine casing 22. An annular space (not shown) lies between shroud 20 and the outer wall of the core engine.

An engine casing 22 within nacelle 24 forms the outer wall of a bypass duct 26 between casing 22 and core 20 into and through which fan 16 forces a flow of compressed air. In normal engine operation, the compressed air flows through bypass duct 26 and out engine outlet 28, adding to engine thrust.

A plurality of thrust reverser assemblies 30 are placed around the circumference of nacelle 24. Details of thrust reversers 30 will be best understood by reference to FIGS. 2 and 3. Thrust reverser 30 is shown in a closed, or flight, position in FIG. 2 and in an open, or reverse thrust, position in FIG. 3.

Figure 2:
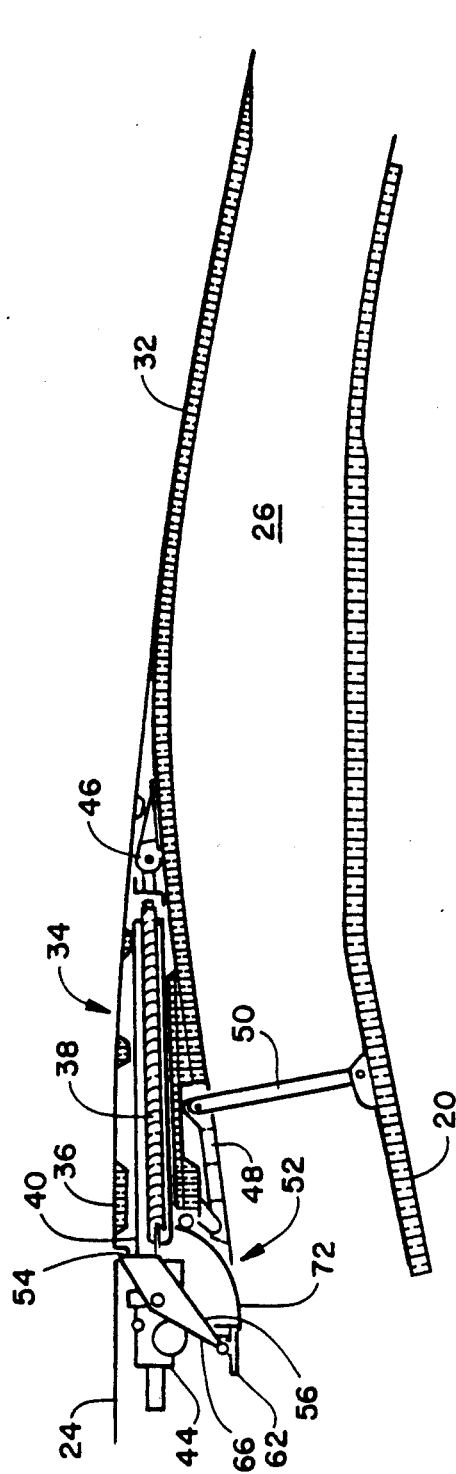
FIG. 2 is a schematic axial section view through the engine thrust reverser assembly in a closed position showing the torque ring assembly.
Figure 3:
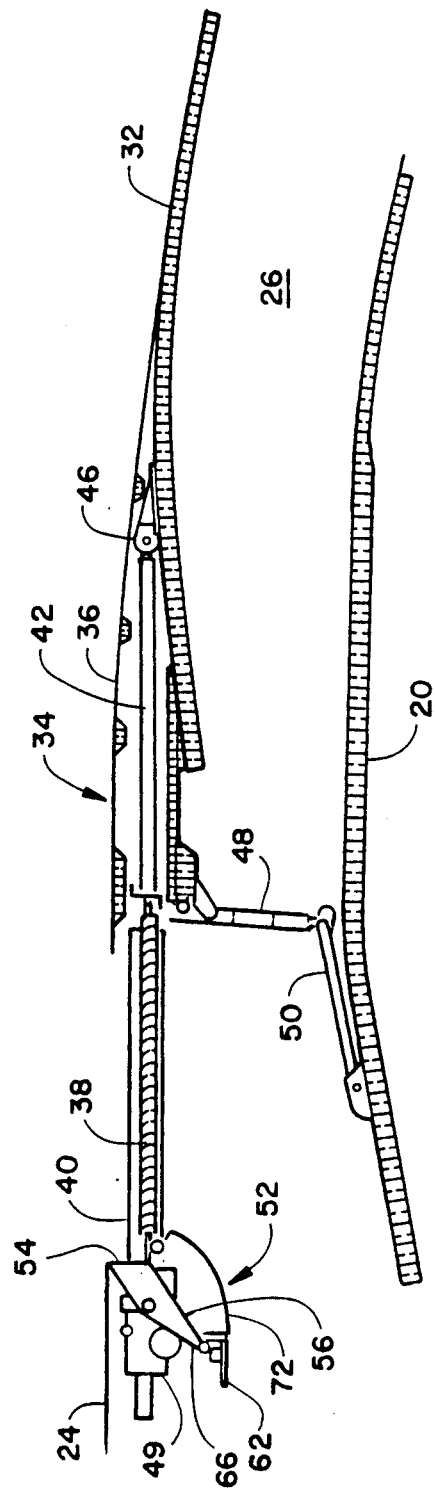
FIG. 3 is a schematic axial section view through the engine thrust reverser assembly in an open position, showing the torque ring assembly.

An elongated panel 32 covers each thrust reverser 30 and is translatable between the closed position of FIG. 2 and the open position of FIG. 3 by an actuator 34. Panel 32 carries a cover 36 forming a "Y" like forward portion which encloses turning vane cascade 38. When panel 32 and cover 36 are open, cascade 38 fills an opening through nacelle 24. Cascade 38 is made up of a plurality of spaced, curved vanes which receive air flow from within duct 26 and turn the flow to a forwardly direction.

Any suitable actuator assembly 34 may be used to move panel 32. Typically, actuator 34 may include a hydraulic cylinder or internal lead screw 40 capable of extending rod 42, driven between positions by a hydraulic motor or electric motor 44. Cylinder or screw 40 lies within a slot through cascade 38 and is secured to cascade 38 to add further strength thereto and provide support to the aft end of the cascade. The extended end of rod 42 bears against a drive fitting 46.

A plurality of blocker doors 48 are provided to obstruct flow of compressed air through bypass duct 26 and force the air through cascade 38 during thrust reversal. In the closed position, blocker doors 48 are flush with panel 32, as seen in FIG. 2. When panel 32 is moved aft to the open position of FIG. 3, links 50 pivot blocker doors 48 into the bypass duct blocking position of FIG. 3.

As can be seen, there are considerable complex aerodynamic forces bearing on cascade 38 during thrust reversal, resulting in primarily tension and shear forces on the forward end of cascade 38. The support means for the cascade forward end must be compact and be light weight while transmitting complex and varying loads to the engine primary structure.

Figure 4:
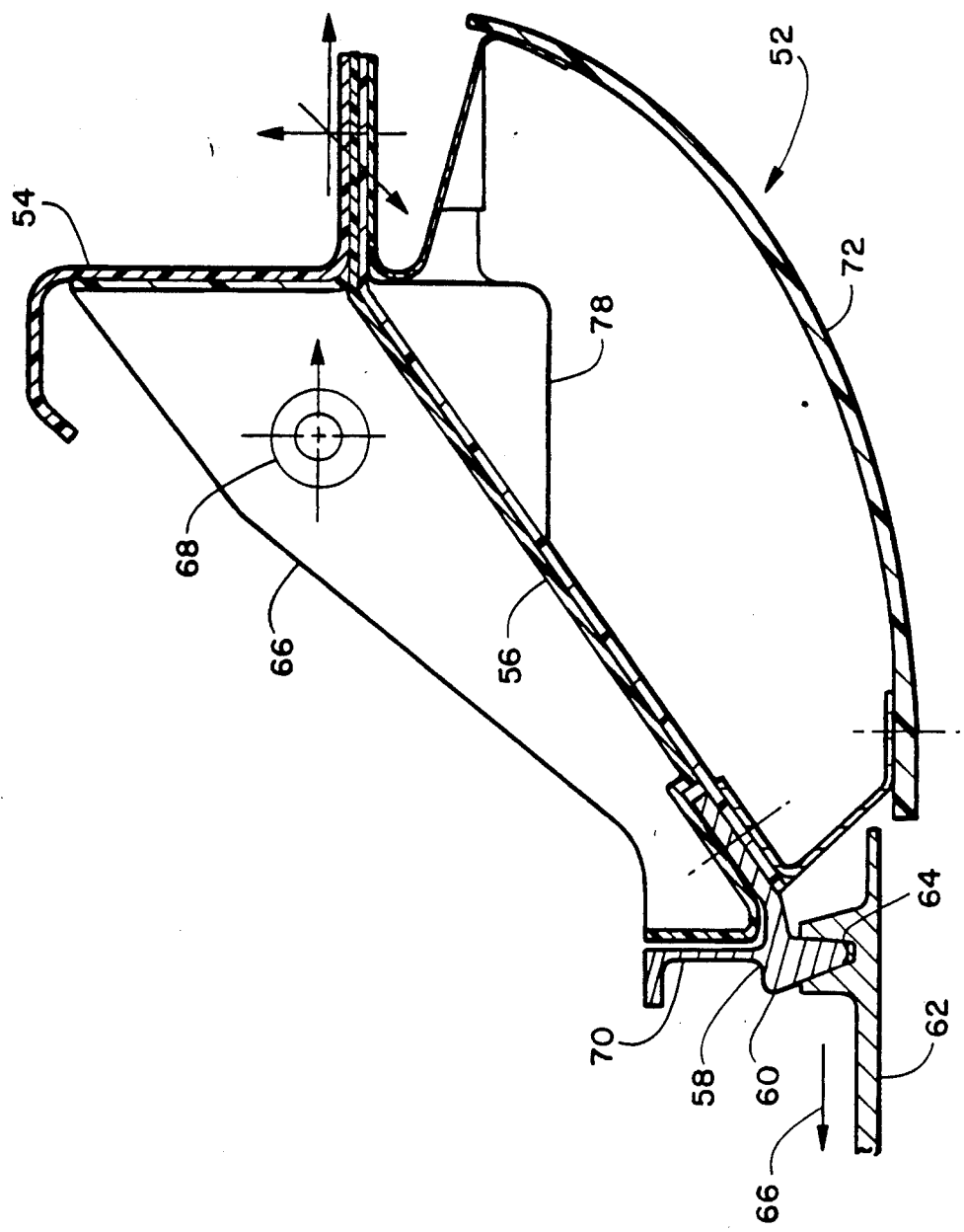
FIG. 4 is a detail axial view through the torque ring assembly.

As best seen in FIG. 2-4, the cascade mounting means comprises a torque ring assembly 52. This assembly basically comprises a bulkhead ring secured to the forward end of each cascade 38, a frustoconical ring secured at its base to bulkhead 54, and a V-blade ring 58 secured to the apex of the frustoconical ring with an inwardly directed V-blade 60.

An engine ring 62 is securely mounted on engine casing 22 and has an outwardly directed grove 64 adapted to receive V-blade 60 in a supporting relationship. The mating V-blade 62 and groove effectively transfer complex and varying loads from cascade 38 to the main engine structure. The primary load reaction provided by groove 64 is indicated by arrow 66.

The torque ring assembly 52 is also well adapted to mounting brackets 66 which carry actuator drive motors 44 at pivot 68. Brackets 66 may be fastened to bulkhead 54, frustoconical ring 56 and/or V-blade ring 58 in any suitable manner. It is preferred to provide an upstanding web 70 on V-blade ring 58 to help support bracket 66.

In order to fair-in the forward end of panel 32 (FIG. 2) and provide a smooth flow of air to cascade 38 (FIG. 3) it is preferred to provide a curved ramp ring 72 along the inner surface of frustoconical ring 56. Ramp ring 72 may be secured to ring 56 by any suitable means, such as bands 74 and 76 at or near the base and apex ends of ring 56, respectively.

While certain preferred arrangements and detailed configurations of components were provided in the above description of a preferred embodiment, these may be varied, where suitable, with similar results. For example, localized brackets and cut-outs in ring 56, such as that shown at 78 may be provided to provide clearance for various actuator mechanisms and motors 44.

I claim:

1. In a thrust reverser system for a gas turbine engine of the type having a core engine with a tubular outer nacelle surrounding said core engine to define an annular bypass duct therebetween, with a fan disposed in the nacelle inlet for directing compressed air flow into said bypass duct;

wherein said thrust reverser system is incorporated into said nacelle aft of said fan and comprises at least one opening through said nacelle, said opening containing a turning vane cascade; an outer door movable between positions covering and uncovering said opening; actuator means for moving said door between said open and closed positions and at least one blocker door aft of said opening and movable between an open position and a closed position obstructing bypass duct flow, the improvement comprising:

a bulkhead ring supporting the forward end of each said turning vane cascade;

a frustoconical ring secured to said bulkhead along the base of said frustoconical ring and mounting an inwardly directed torque ring V-blade along the frustoconical ring apex;

an engine ring secured to primary engine structure adjacent to said nacelle and having an outwardly directed groove adapted to receive said V-blade; and a curved ramp ring secured to said frustoconical ring at the inner edges of said bulkhead and said torque ring to smooth air flow from said bypass duct to said turning vane cascade;

whereby load paths from said turning vane cascade and actuator means to said primary engine structure are simplified and loads are uniformly transmitted.

2. The improvement according to claim 1 further including means for mounting the forward end of each cover actuator to said torque ring assembly whereby actuator loads are transferred to said primary engine structure.

3. The improvement according to claim 1 wherein said bulkhead ring and frustoconical ring are formed from a composite material comprising high strength fibers in a resin matrix and said V-blade and engine ring are formed from metal.

4. The improvement according to claim 1 wherein said fibers are high strength graphite fibers.

* * * * *